United States Patent [19]
Brazell

[11] 3,731,750
[45] May 8, 1973

[54] PLOW HITCH

[75] Inventor: James W. Brazell, Atlanta, Ga.

[73] Assignee: Heath International, Inc., Richmond, Mich.

[22] Filed: Feb. 16, 1971

[21] Appl. No.: 115,497

[52] U.S. Cl. .................. 172/457, 172/491, 280/492
[51] Int. Cl. ............................................. A01b 63/00
[58] Field of Search................... 172/452, 315, 316, 172/324, 326, 439, 448, 450, 457, 491, 668, 677, 680, 467; 280/405, 492

[56] References Cited

UNITED STATES PATENTS

| | | | |
|---|---|---|---|
| 2,818,664 | 1/1958 | Bond | 172/326 X |
| 3,583,494 | 6/1971 | Thompson et al. | 172/439 X |
| 3,405,767 | 10/1968 | Thompson | 172/572 |

*Primary Examiner*—Robert E. Pulfrey
*Assistant Examiner*—Stephen C. Pellegrino
*Attorney*—Donnelly, Mentag & Harrington

[57] ABSTRACT

A plow hit for attaching a plow to a tractor or the like and which includes a means for centering the plow when it is raised to the transport position. The hitch includes a swivel attachment member for attaching the plow hitch to a hitch means on a powered vehicle, a swivel arm hingedly mounted at the front end on the swivel attachment vertical axis, a pivot assembly for attachment to a plow and which is pivotally mounted to the rear of the swivel arm about a horizontal pivot axis, power means carried by the swivel arm and connected to the pivot assembly for pivoting the plow about said horizontal pivot axis between lowered and raised positions, and means on the swivel attachment member and pivot assembly for limiting the horizontal swinging movement of the plow when it is in the lowered position, and for maintaining the plow in a centered position when the plow is in a raised position.

3 Claims, 13 Drawing Figures

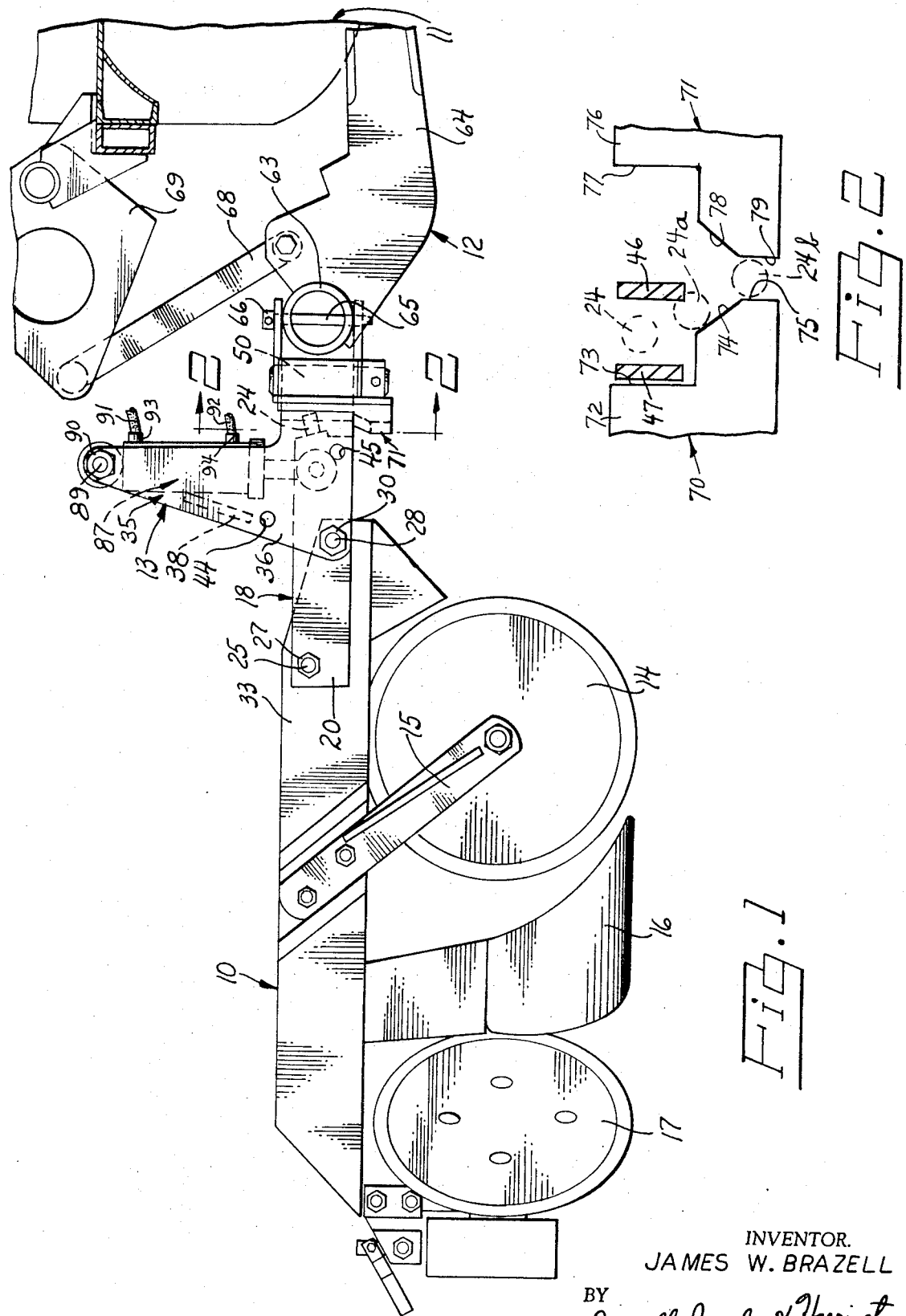

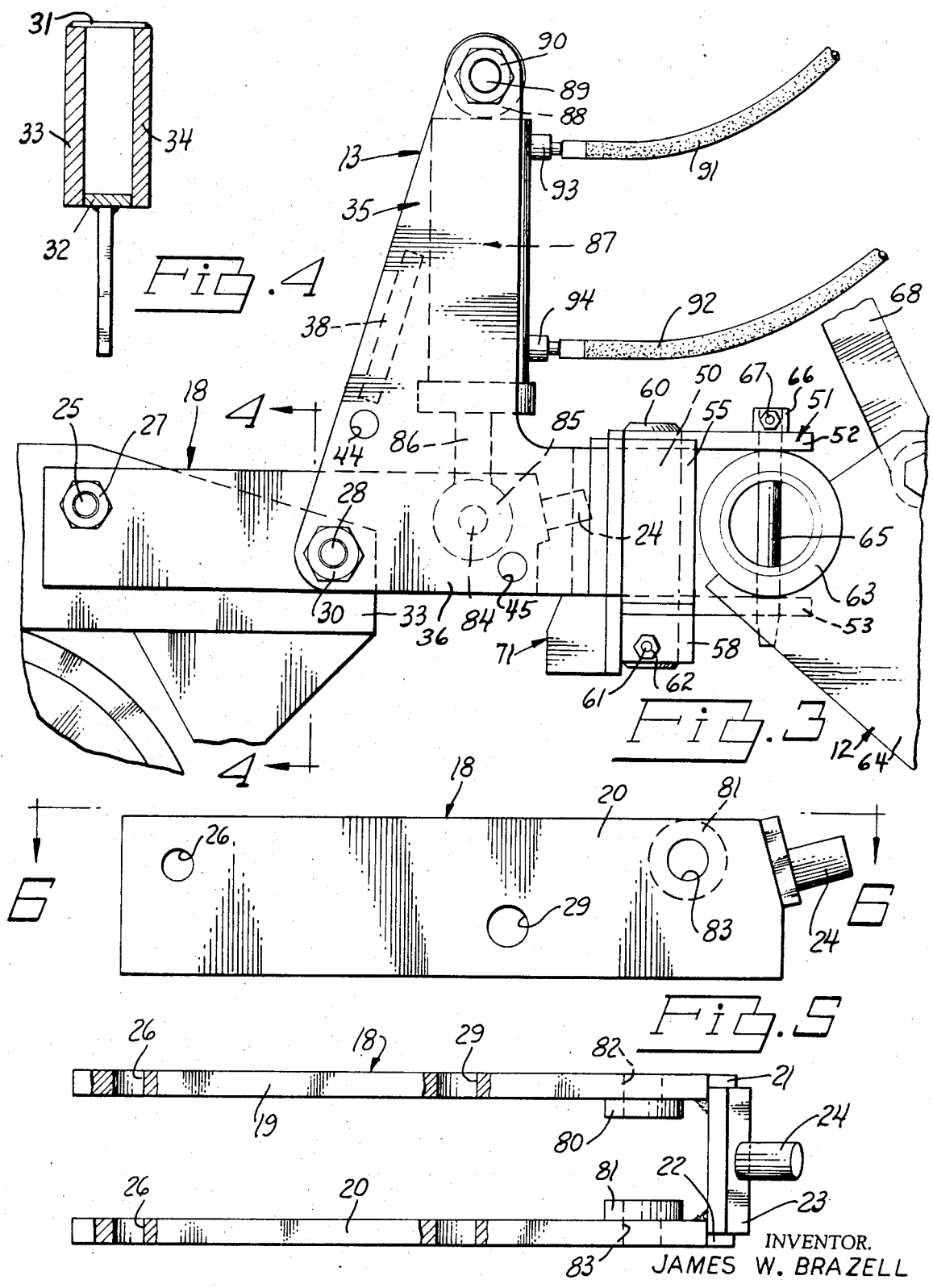

Patented May 8, 1973
3,731,750
4 Sheets-Sheet 3
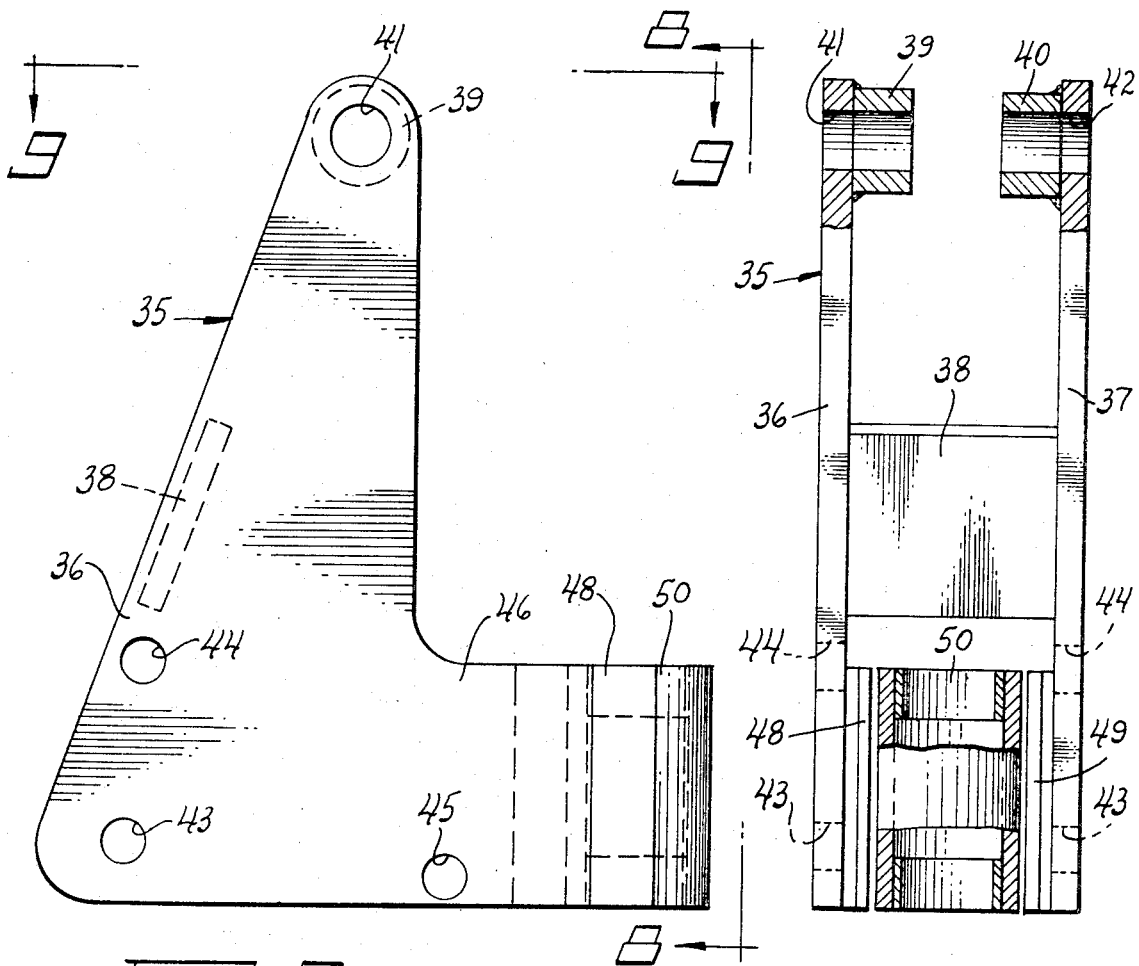
Fig.7  Fig.8
Fig.9
INVENTOR.
JAMES W. BRAZELL
BY
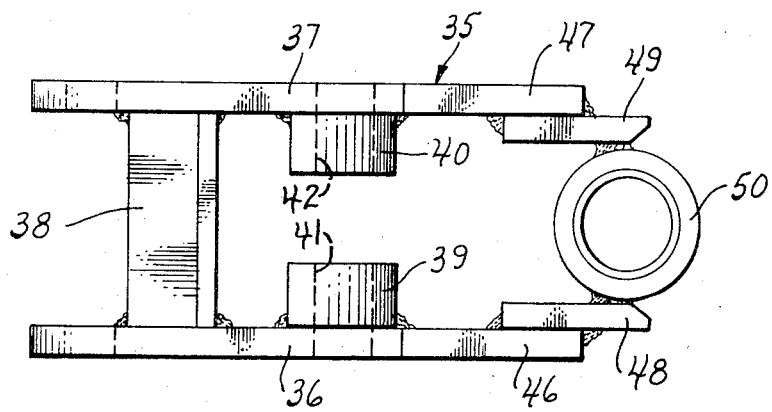
ATTORNEYS INVENTOR.
JAMES W. BRAZELL
BY
Donnelly, Mentag & Harrington
ATTORNEYS

PLOW HITCH

SUMMARY OF THE INVENTION

This invention relates generally to plow hitches, and more particularly, to a novel and improved plow hitch which permits the plow to swing relative to a pulling tractor during use of the plow but which will center the plow when it is raised to the transport position.

It is an object of the present invention to provide a novel and improved plow hitch which incorporates a simple and compact centering means. It allows the plow to pivot in a horizontal direction when in use and yet which is adapted to retain the plow in a centered position during transport of the same and which further includes a means for locking the plow in a raised or transport position.

It is another object of the present invention to provide a novel and improved plow hitch which includes a swivel structure adapted to be attached to a tractor lifting hitch and a pivot structure for interconnecting the plow to the swivel structure, and means for pivoting said pivot structure to raise the plow to a centered transport position.

It is still another object of the present invention to provide a novel and improved plow hitch which is simple and compact in construction, economical to manufacture and efficient in operation.

Other features and advantages of this invention will be apparent from the following detailed description, appended claims, and the accompanying drawings.

BRIEF DESCRIPTION OF THE DRAWINGS

FIG. 1 is a side elevational view of a plow hitch structure made in accordance with the principles of the present invention.

FIG. 2 is a schematic, fragmentary view of the structure illustrated in FIG. 1, taken along the line 2—2 thereof, and looking in the direction of the arrows.

FIG. 3 is a fragmentary, enlarged, side elevational view of the plow hitch structure illustrated in FIG. 1.

FIG. 4 is a fragmentary, elevational, section view of the structure illustrated in FIG. 3, taken along the line 4—4 thereof, and looking in the direction of the arrows.

FIG. 5 is a side elevational view of the pivot assembly employed in the plow hitch structure illustrated in FIG. 3.

FIG. 6 is a top plan view of the pivot assembly structure illustrated in FIG. 5, taken along the line 6—6 thereof, and looking in the direction of the arrows.

FIG. 7 is a side elevational view of the swivel arm employed in the plow hitch of FIG. 3.

FIG. 8 is a right side elevational view of the swivel arm structure illustrated in FIG. 7, taken along the line 8—8 thereof, and looking in the direction of the arrows.

FIG. 9 is a top plan view of the swivel arm structure illustrated in FIG. 7, taken along the line 9—9 thereof, and looking in the direction of the arrows.

DESCRIPTION OF THE PREFERRED EMBODIMENT

Figure 10:
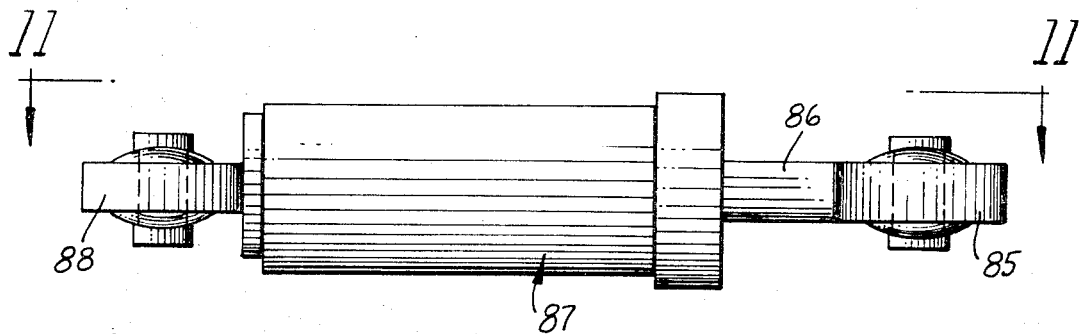
FIG. 10 is an elevational view of a hydraulic cylinder employed in the hitch structure of FIG. 3.
Figure 11:
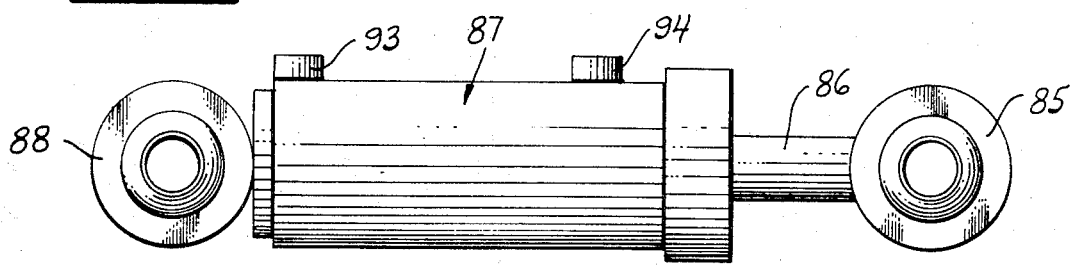
FIG. 11 is a top plan view of the cylinder illustrated in FIG. 10, taken along the line 11—11 thereof, and looking in the direction of the arrows.

Referring now to the drawings, and in particular to FIG. 1, the numeral 10 generally designates a fire lane plow of a conventional type which is attached to a suitable pulling and powered vehicle generally indicated by the numeral 11. The plow 10 is attached to the vehicle 11 by a lift hitch 12 and a plow hitch generally indicated by the numeral 13 and made in accordance with the principles of the present invention. The details of the lift hitch 12 have not been shown since the lift hitch 12 does not form any part of the present invention. The details of the lift hitch 12, however, are disclosed in my copending application which is owned by a common assignee and entitled "Universal Three-Point Implement Hitch." The lift hitch 12 described in said copending application includes a free-floating lower link which, in conjunction with the plow of the present invention provides an effective combination for fire lane plowing. The overall combination of the plow 11 and the lift hitch 12 provides a combination wherein the plow is pulled from a trunnion point which is far forward on the pulling vehicle 11 and near the line of pull. The prior art fire lane plows, lift hitches and pulling vehicles were not capable of providing such an effective fire lane plowing apparatus. This combination of structure permits the plow 11 to be pulled over rough terrain and automatically compensate for the change in the terrain so that the plow will stay in the ground. The prior art structures did not have the means for changing the draft or pitch while the plow was being pulled to compensate for the variations in the soil conditions, inclines and terrain. A problem with the prior art fire lane plows is that they will sometimes skip portions in forming a fire lane and this action necessitates the need for returning to complete the fire lane, either with a plow or with another apparatus, such as a bulldozer blade.

The plow 10 contains a first cutter 14 supported by an arm 15 and two conventional blades 16 and 17.

As shown in FIGS. 3, 5 and 6, the plow hitch 13 contains a pivot assembly 18 which includes a pair of spaced apart elongated plates 19 and 20, as shown in detail in FIG. 6. The front ends of the plates 19 and 20 are each provided with a tapered front face, as 21 and 22, on which is attached, as by welding, an upwardly and rearwardly sloping transverse plate 23. Fixedly mounted on the plate 23, is a pivot pin 24. The rear end of the pivot assembly 18 is attached, as shown in FIG. 1, by a suitable bolt 25 which passes through the holes 26 (FIG. 6) formed in the plates 19 and 20 and is secured to the plow 10 by the nut 27. A second bolt 28 is also used to secure the pivot assembly to the plow 10. As shown in FIG. 6, the pivot assembly plates 19 and 20 are provided with holes 29 through which the bolt 28 is extended. Nut 30 is provided to secure the bolt 28 in place. The plow 10 includes a pair of plow arms 33 and 34 which are fixedly connected by the transverse plates 31 and 32.

As shown in FIG. 7, the plow hitch is provided with a swivel arm generally indicated by the numeral 35. As shown in FIG. 9, the swivel arm 35 includes a pair of vertically disposed plates 36 and 37 which are interconnected by a fixedly mounted plate 38. The upper ends of the plates 36 and 37 are provided with pivot bushings 39 and 40 which are secured to the plates 36 and 37 by any suitable means, as by welding. The plates 36 and 37 are also provided with the transverse bores 41 and 42 (FIG. 8) respectively, which are aligned with the bushings 39 and 40.

As shown in FIGS. 1 and 7, the plates 36 and 37 are provided with a transverse hole 45 for holding the locking pin to lock the plow in a raised position, as explained hereinafter. These plates are also provided with a second transverse hole 44 for retaining a suitable lock pin (not shown) for use in locking the plow in a raised position. The plates 36 and 37 are also provided with a hole 43 for attaching the pivot arm 35 to the plow 10 by means of the bolt 28, as shown in FIG. 1.

As shown in FIGS. 7, 8 and 9, the swivel arm 35 is provided with forwardly extended feet or portions 46 and 47, on the plates 36 and 37, respectively. As shown in FIG. 9, a plate 48 is attached to the front end of the portion 46, and a plate 49 is attached to the front end of the portion 47. A cylindrical swivel member 50 is fixedly secured between the plates 48 and 49 by any suitable means, as by welding.

Figure 13:
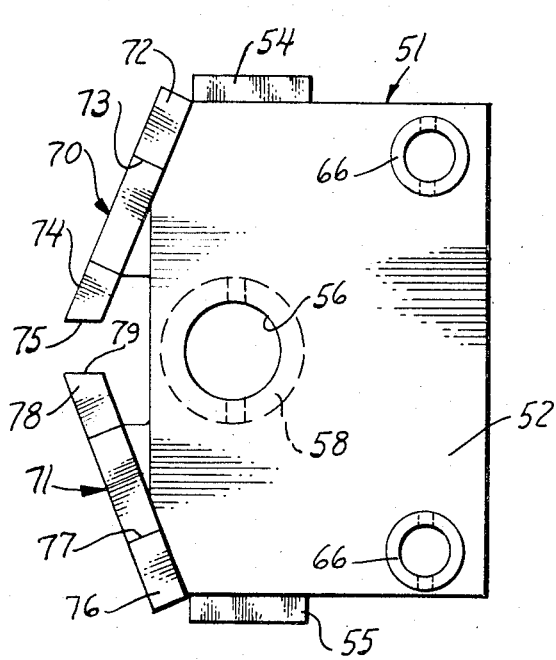
FIG. 13 is a top plan view of the structure illustrated in FIG. 12.
Figure 12:
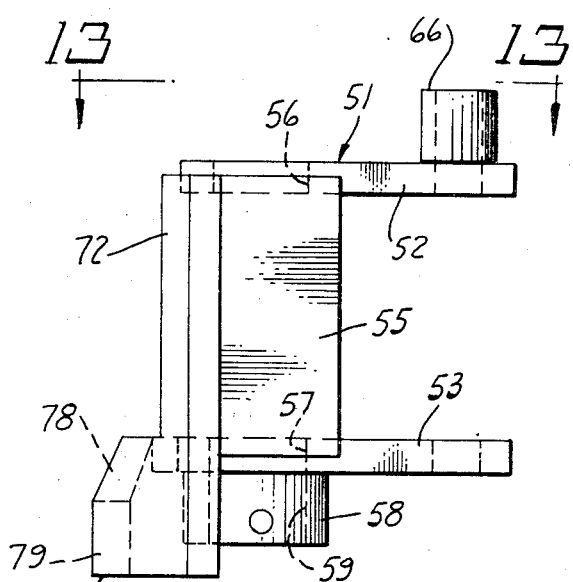
FIG. 12 is a side elevational view of the swivel hitch attachment structure illustrated in the hitch structure of FIG. 3.

As shown in FIG. 3, the swivel arm 35 is hingedly attached by a swivel connector member 51 to the lift hitch 12. As shown in FIG. 12, the swivel attachment member 51 includes a pair of vertically spaced apart horizontal plates 52 and 53 which are connected together by a pair of vertical side plates 54 and 55, as shown in FIG. 13. As shown in FIG. 12, the top plate 52 is provided with a bore 56 that is aligned with a bore 57 in the lower plate 53. Secured, as by welding, to the lower side of the plate 53, is a bushing 58 that has a bore 59 which is aligned with the bore 57.

As shown in FIG. 3, the swivel cylinder 50 on the swivel arm 35 is adapted to be seated between the plates 52 and 53 and to be secured in such position by a vertically disposed swivel pin 60. The swivel pin 60 is secured in place in the bushing 58 by a transverse bolt 61 and nut 62.

The hitch attachment member 51 is adapted to receive the transverse tubular shaft 63 of the hitch 12 between the plates 52 and 53. A pair of vertically disposed retainer pins 65 are adapted to be extended downwardly through the bushings 66 shown in FIG. 13 at the top of the plate 52 and through suitable holes in the plates 52 and 53, and the transverse tubular shaft 63. The pins 65 are secured in place by a transverse bolt and nut assembly as 67 (FIG. 3). As shown in FIG. 1, the lift hitch tubular shaft 63 is fixed on the rear end of the lift hitch lower link structure 64 which in turn is adapted to be lifted by the link 68 and the rotatable lever 69.

As illustrated in FIGS. 2 and 13, the swivel attachment member 51 is provided on the rear end thereof with a pair of cam plates 70 and 71 which have the outer vertical portions 72 and 76. The cam plates 70 and 71 are angled rearwardly and toward each other as shown in FIG. 13. The vertical cam portions 72 and 76 are provided with the vertical side stop surfaces 73 and 77 between which the plates 46 and 47 extend. It will be understood that when the plow is in the lowered and working position that the plates 46 and 47 would be free to swing between the vertical side stop surfaces 73 and 77. The relative positions of the plates 46 and 47 at the left stop are shown in FIG. 2. When the plow 10 is raised by the hereinafter described cylinder 87, the pivot pin 24 moves to the position 24a, shown in FIG. 2, where it engages either one of the downwardly sloping cam surfaces 74 or 78 on the cams 70 and 71. Continued raising movement of the plow moves the pivot pin 24 down between the two vertical cam surfaces 75 and 79 to the position 24b where the plow is retained in a raised and centered position. In the raised and centered position, the plow 10 cannot swing sidewardly, but it will be seen that when the plow is in a lowered position, the aforedescribed structure will permit the horizontal swinging of the plow through an angle of about 45°.

As shown in FIG. 6, the pivot assembly 18 is provided with a pair of bushings 80 and 81 which are secured to the plates 19 and 20, and in alignment with the bores 82 and 83 formed through these plates. As shown in FIG. 3, a lift hydraulic cylinder 87 is mounted on the pivot arm 35 and the cylinder rod 86 is provided with a suitable ball joint assembly 85 that is secured by the pivot pin 84 to the pivot assembly 18. The pin 84 is mounted in the bores 82 and 83 in the plates 19 and 20. The upper end of the cylinder 87 is secured by the bolt 89 and nut 90, and the ball joint assembly 88, to the upper end of the swivel arm 35. The bolt 89 passes through the bores 41 and 42 (FIG. 8) in the arms 36 and 37. The cylinder 87 is supplied by fluid under pressure from a suitable source of pressurized fluid on the vehicle 10, by means of the conduits 91 and 92 and the hydraulic fittings 93 and 94, as shown in FIG. 3.

In use, the cylinder 87 is actuated to pivot the plow to the desired draft or pitch. When it is desired to transport the plow, the cylinder 87 is actuated to move the pivot pin 24 downwardly between the cam surfaces 75 and 79. A pin stored in the hole 44 may be removed at that time and placed through the hole 45 and pass over the top of the plates 19 and 20 to provide a mechanical lock to prevent the plow 10 from rotating downwardly in case of a hydraulic failure.

While it will be apparent that the preferred embodiment of the invention herein disclosed is well calculated to fulfill the objects above stated, it will be appreciated that the invention is susceptible to modification, variation and change.

What is claimed is:

1. In a plow hitch the combination comprising:
    a. a swivel attachment member for attaching the plow hitch to a hitch means on a powered vehicle;
    b. a swivel arm being hingedly mounted at its front end on said swivel attachment on a vertical axis;
    c. a pivot assembly having means for attachment to a plow and being pivotally mounted to the rear end of said swivel arm about a horizontal pivot axis;
    d. power means carried by said swivel arm and connected to said pivot assembly for pivoting said plow about said horizontal pivot axis between lowered and raised positions; and,
    e. means on said swivel attachment member and pivot assembly for limiting the horizontal swinging movement of the plow when it is in the lowered position and for maintaining the plow in a centered position when the plow is in a raised position.

2. The structure as defined in claim 3, wherein said means for limiting the horizontal swinging movement and for centering the plow includes:
   a. a pair of spaced apart cam plates on said swivel attachment member;
   b. each of said cam plates having an upwardly disposed vertical side stop surface, a centering vertical surface disposed laterally inward and downward from said side stop vertical surface, a sloping cam surface extending upwardly and outwardly from the upper end of said centering vertical surface, and a horizontal surface extending laterally outward from the upper end of the sloping cam surface to the bottom of the vertical side stop surface;
   c. means on said pivot assembly for movement between and for contacting the vertical side stop surfaces on said cam plates to limit the horizontal swinging movement of the plow when it is in the lowered position; and,
   d. means on said pivot assembly for contacting either one of said sloping cam surfaces on said cam plates for guiding the plow into a centered position when it is being raised to said raised position, and said last mentioned means also being adapted to be disposed between the centering vertical surfaces on said cam plates to retain the plow in the centered position when it is in the raised position.

3. The structure as defined in claim 2, including:
   a. means on the swivel arm for locking the pivot assembly and the plow in the raised position.

* * * * *